United States Patent
Loreskär et al.

(10) Patent No.: US 11,146,962 B2
(45) Date of Patent: Oct. 12, 2021

(54) MULTI-SIM SECURE OPERATIONAL MODE CHANGE

(71) Applicant: TRUSTONIC LIMITED, Cambridge (GB)

(72) Inventors: Chris Loreskär, Cambridge (GB); Andrew Paul Mell, Cambridge (GB)

(73) Assignee: Trustonic Limited, Cambridge (GB)

( * ) Notice: Subject to any disclaimer, the term of this patent is extended or adjusted under 35 U.S.C. 154(b) by 0 days.

(21) Appl. No.: 16/864,345

(22) Filed: May 1, 2020

(65) Prior Publication Data
US 2020/0351652 A1 Nov. 5, 2020

(30) Foreign Application Priority Data

May 3, 2019 (GB) ...................................... 1906276
Nov. 22, 2019 (GB) ...................................... 1917051

(51) Int. Cl.
*H04W 12/06* (2021.01)
*H04W 12/30* (2021.01)
(Continued)

(52) U.S. Cl.
CPC ........... *H04W 12/35* (2021.01); *H04W 12/06* (2013.01); *H04W 12/45* (2021.01); *H04W 48/18* (2013.01)

(58) Field of Classification Search
CPC ..... H04W 8/183; H04W 12/00; H04W 12/06; H04W 12/35; H04W 12/37; H04W 12/45;
(Continued)

(56) References Cited

U.S. PATENT DOCUMENTS

| | | | |
|---|---|---|---|
| 2005/0190789 A1* | 9/2005 | Salkini | H04W 88/16 370/466 |
| 2013/0016682 A1* | 1/2013 | Russell | G01S 5/0252 370/329 |

(Continued)

*Primary Examiner* — Jean A Gelin
(74) *Attorney, Agent, or Firm* — Nixon & Vanderhye P.C.

(57) ABSTRACT

A method for performing secure change of operational mode of a multi-SIM telecommunications device, the method comprising: enabling each of a plurality of modem modules of the telecommunications device in a limited operational mode; performing a first verification, by a first authentication module of a plurality of authentication modules of the telecommunications device, to verify the validity of a first subscriber identity module associated with a first modem module of the plurality of modem modules in accordance with network configuration information, wherein responsive to a positive first verification the first modem module is transitioned to an enhanced operational mode and the first modem module performs a network attachment procedure to a first network using the first subscriber identity module; performing a second verification to verify active attachment of the first modem module to the first network in accordance with the network configuration information; providing the result of the second verification to a second authentication module of the plurality of authentication modules; performing a third verification, by the second authentication module, to verify the validity of a second subscriber identity module associated with a second modem module of the plurality of modem modules based on the network configuration information, wherein responsive to both a positive second verification of the first modem module and a positive third verification, the second modem module is transitioned to an enhanced operational mode and the second modem module performs a network attachment procedure to a second network using the second subscriber identity module.

17 Claims, 5 Drawing Sheets

(51) Int. Cl.
*H04W 48/18* (2009.01)
*H04W 12/45* (2021.01)

(58) Field of Classification Search
CPC ... H04W 12/48; H04W 48/18; H04W 60/005; H04W 88/02
See application file for complete search history.

(56) References Cited

U.S. PATENT DOCUMENTS

| | | | |
|---|---|---|---|
| 2014/0098761 A1* | 4/2014 | Lee | H04W 24/02 370/329 |
| 2014/0274036 A1* | 9/2014 | Fan | H04W 12/04 455/432.1 |
| 2015/0065109 A1* | 3/2015 | Kanamarlapudi | H04W 52/0216 455/418 |
| 2015/0156718 A1* | 6/2015 | Skaaksrud | G05D 1/0088 370/311 |
| 2015/0181433 A1* | 6/2015 | Li | H04W 8/22 726/4 |
| 2015/0264090 A1* | 9/2015 | Kim | H04L 43/0876 370/329 |
| 2016/0100309 A1* | 4/2016 | Velusamy | H04W 12/08 380/270 |
| 2018/0110008 A1* | 4/2018 | Lin | H04W 52/0261 |
| 2019/0021021 A1* | 1/2019 | Thangarasa | H04W 24/08 |
| 2019/0098487 A1* | 3/2019 | Boettger | H04W 76/12 |
| 2019/0223132 A1* | 7/2019 | Miao | H04W 76/15 |
| 2020/0336887 A1* | 10/2020 | Ou | H04W 8/24 |

* cited by examiner

MULTI-SIM SECURE OPERATIONAL MODE CHANGE

CROSS-REFERENCE TO RELATED APPLICATIONS

This application claims priority to GB application GB1906276.9 filed 3 May 2019 entitled "Remote Secure Unlock", and claims priority to GB application GB1917051.3 filed 22 Nov. 2019 entitled "Multi-SIM Carrier-Lock". The disclosure of both applications is incorporated herein by reference in their entirety.

FIELD AND BACKGROUND

The present techniques relate to the field of network locking and unlocking of telecommunications devices. More particularly, the described techniques relate to various techniques by which a mobile network operator (mobile carrier) can control the manner in which a multi-sim telecommunications device is permitted to connect to a plurality of networks.

In certain prior approaches various techniques have been provided which allow a network operator to control the operational mode of a telecommunications device as a whole, for example, when a subsidised telecommunications device has been provided to a user subject to the user maintaining a network services subscription such that if the user allows the subscription to lapse the telecommunications device is only permitted to operate in a limited operation mode.

However, with the advent of telecommunications devices which include a plurality of subscriber identity modules slots, users have been able to use combinations of subscriber identity modules to subvert network operators control over subsidised devices.

At least certain embodiments of the present disclosure provides an implementation which addresses one or more of these problems as set out above.

SUMMARY

Particular aspects and embodiments are set out in the appended claims.

Viewed from one perspective, there can be provided a method for performing secure change of operational mode of a multi-SIM telecommunications device, the method comprising: enabling each of a plurality of modem modules of the telecommunications device in a limited operational mode; performing a first verification, by a first authentication module of a plurality of authentication modules of the telecommunications device, to verify the validity of a first subscriber identity module associated with a first modem module of the plurality of modem modules in accordance with network configuration information, wherein responsive to a positive first verification the first modem module is transitioned to an enhanced operational mode and the first modem module performs a network attachment procedure to a first network using the first subscriber identity module; performing a second verification to verify active attachment of the first modem module to the first network in accordance with the network configuration information; providing the result of the second verification to a second authentication module of the plurality of authentication modules; performing a third verification, by the second authentication module, to verify the validity of a second subscriber identity module associated with a second modem module of the plurality of modem modules based on the network configuration information, wherein responsive to both a positive second verification of the first modem module and a positive third verification, the second modem module is transitioned to an enhanced operational mode and the second modem module performs a network attachment procedure to a second network using the second subscriber identity module. From one perspective, an active network connection can be thought of, for example, as the telecommunications device having been registered onto the network and monitoring at least one channel of the network.

In other words, the present approach can be considered for example as ensuring that all of a plurality of modem modules are placed into a limited operational mode and prevented from attaching, with their subscriber identity modules, to their corresponding networks until conditions set out in a network configuration information have been met. Thereby, security and control can be maintained by the network operator over the telecommunication device, for example a subsidised device under contract.

As part of the conditions, permission for a second subscriber identity module to attach to a second network is dependent on both the second subscriber identity module individually meeting the conditions set out in a network configuration information but also dependent on there already being another active connection to a first network. The network operator which controls the telecommunications device may also operate the first network. Thereby, by checking for an active network connection to the first network the present approach provides an implementation which avoids an issue with more simplistic techniques whereby the telecommunications device is permitted to transition to an enhanced operational mode simply on the basis of, a potentially inactive, subscriber identity module of the first network. Thereby the present implementation allows for the telecommunications device to connect to networks other than the first network operated by the network operator, while allowing the network operator to ensure that their network is actively being utilized. It will be appreciated that, in some examples, the first and/or second network may not be operated by the network operator which controls the telecommunications device.

Viewed from one perspective, there can be provided a computer program for controlling a device to perform any of the above-described methods. In some examples, the computer program is stored on a storage medium.

Viewed from one perspective, there can be provided a device comprising: processing circuitry to perform data processing; and data storage storing at least one computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

It will be recognised that the features of the above-described examples of the disclosure can conveniently and interchangeably be used in any suitable combination.

DETAILED DESCRIPTION

Figure 1:
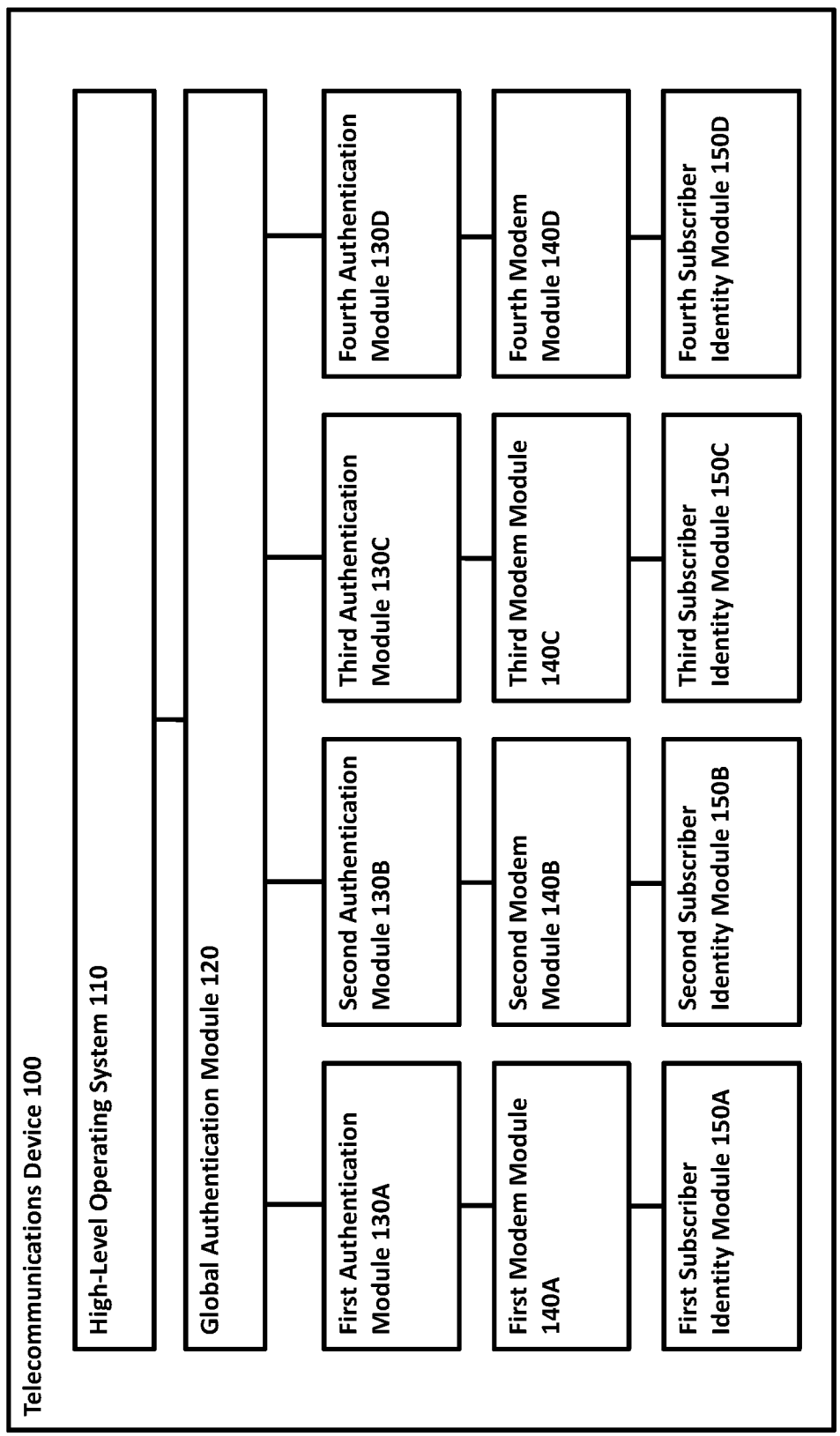
FIG. 1: Schematically illustrates a telecommunication device configured to operate according to teachings of the disclosure.

FIG. 1 shows a schematic illustration of a telecommunication device configured to operate according to teachings of the disclosure. The figure depicts a telecommunications device 100. In some examples, the telecommunications device 100 is a mobile phone, tablet, mobile hotspot, laptop with integrated cellular connection or any other device capable of connecting to mobile telecommunications network.

In the current example the telecommunications device 100 includes: a high-level operating system 110; a global authentication module 120; first to fourth authentication modules 130A, 130B, 130C, 130D; first to fourth modem modules 140A, 140B, 140C, 140D; and first to fourth subscriber identity modules 150A, 150B, 150C, 150D. It will be appreciated that in other examples, instead of four sets of authentication modules, modem modules and subscriber identity modules there may be any number from two to eight or more. Thereby, the present approach is applicable to a broad range of multi-sim telecommunication devices with different numbers of elements.

In the current examples, the high-level operating system 110 acts to provide a user interface to a user. The high-level operating system may be configured to allow a user to input information which can act to configure or update network configuration information. In some examples, the high-level operating system 110 is one of Android, iOS, Windows, macOS, Unix or Linux. It will be appreciated that the high-level operating system 110 is not essential to the described teachings which are performed by the other elements depicted in FIG. 1. In some examples, the high-level operating system 110 is not communicatively coupled to the other elements depicted in FIG. 1. In other examples, the telecommunications device 100 does not include a high-level operating system 110.

In the current example, global authentication module 120 is present. The global authentication module 120 acts to co-ordinate verification of the validity of the subscriber authentication modules 150, in particular, where the validity of a given subscriber identity module 150 is dependent on the status of another of the subscriber identity modules. The verification of the validity of the subscriber identity modules 150 is performed based on network configuration information. It will be appreciated that in some examples, there need not be a dedicated global authentication module 120 and that its functionality may be performed by one or more of the first to fourth authentication modules 130. In other examples, the global authentication module 120 is performed by all of the first to fourth authentication modules 130. In the current example, the global authentication module can act as a unified element that can co-ordinate the validity of all of the subscriber identity modules present within the telecommunications device which can be computationally and energy efficient. In other examples, where the global authentication module is not present, the telecommunications device is able to perform the described approach without the need for an extra module which can be efficient to manufacture.

The authentication modules 130 act to verify the validity of the subscriber identity module 150 associated with their corresponding modem module 140. The authentication module verifies the validity based on network configuration information. In the current examples, each of the first to fourth authentication modules 130 are depicted as separate entities, thereby each authentication module is only responsible for its own modem module 140 and associated subscriber identity module 150 allowing for a secure separation between each of the authentication modules 130. In other examples, a plurality of authentication modules may be combined to allow for efficient manufacture. In further examples, one or more authentication modules 130 may be combined with the global authentication module 120 to allow for efficient manufacture. In other examples, two or more modem modules 140 can be combined into a single combined modem unit. Such a combined modem unit, can allow the telecommunications device to actively connect to two or more networks simultaneously. Depending on the configuration of the combined modem unit this unit may only allow data and/or calls to be made on one of the two or more networks at a given time. In further examples, two or more subscriber identity modules 150 may be associated with a single modem module 140. Again depending on the configuration such a modem module 140 with two or more associate subscriber identity modules 150 may only allow data and/or calls to be made on one of the two or more networks at a given time.

The modem modules 140 act to attach the telecommunications device 100 to a network based on information retrieved from their associated subscriber identity module 150. The modem modules 140 are controlled by their corresponding authentication module in accordance with the techniques described. In the current example, each of the first to fourth authentication module 130 is depicted as separate from its corresponding one of the first to fourth modem module 140. This can allow each element to be modularly replaceable, for example, by an OEM. This approach can also be secure by separating the verification element (authentication module) from the network handling element (modem module). It will, however, be appreciated that each authentication module 130 and corresponding modem module 140 may be combined with each other to allow for efficient manufacture.

The subscriber identification modules 150 include information necessary to allow a modem module 140 to attach to a specific network. In some examples, the subscriber identification modules include an integrated circuit card identifier (ICCID) and an international mobile subscriber identity (IMSI) or a 5G subscription permanent identifier (5G-SUPI). The ICCID acts as a unique serial number for the subscriber identification module. The IMSI or 5G-SUPI comprises three parts: a mobile country code (MCC) that identifies the country, a mobile network code (MNC) that identifies the network, and a mobile subscriber identification number (MSIN) that identifies the subscriber. In some examples, each of the subscriber identity modules is one of a range of physical and non-physical subscriber identity module technologies, for example, SIM, eSIM, USIM, iSIM, eUICC, iUICC, TEE-SIM and SoftSIM. It will be appreciated, that the plurality of subscriber identity modules present within the telecommunications device 100 may use different subscriber identity modules. For example, a telecommunications device 100 may have one or more physical subscriber identity modules such as SIM and one or more non-physical subscriber identity modules such as eSIM. Including compatibility with a range of different subscriber identity module technologies can provide flexibility to an end user of the device. In the current example each of the first to fourth subscriber identity modules are shown as being present inside the telecommunications device 100. It will, however, be appreciated that subscriber identity modules 150 may be user-replaceable elements and as such not all of the subscriber identity modules may be present at any given time. By having replaceable subscriber identity modules 150 the end user has flexibility to swap and replace these, for example, when travelling abroad to use a local subscriber identity module 150.

In the current example, all of the above-described elements are communicatively connected to each other in a hierarchical arrangement as follows subscriber identity module 150→modem module 140→authentication module 130→global authentication module 120→high-level operating system 110. A hierarchical arrangement can allow for secure control and distribution of data. It will be appreciated that other arrangements of communicative connections are possible. For example, all of the high-level operating system 110, global authentication module 120, authentication modules 130 and modem modules 140 may be connected to a common bus.

While certain combinations of various elements depicted in FIG. 1 have been described above, the present inventors have contemplated that substantially any of the elements may be logically and/or physically combined.

Figure 2:
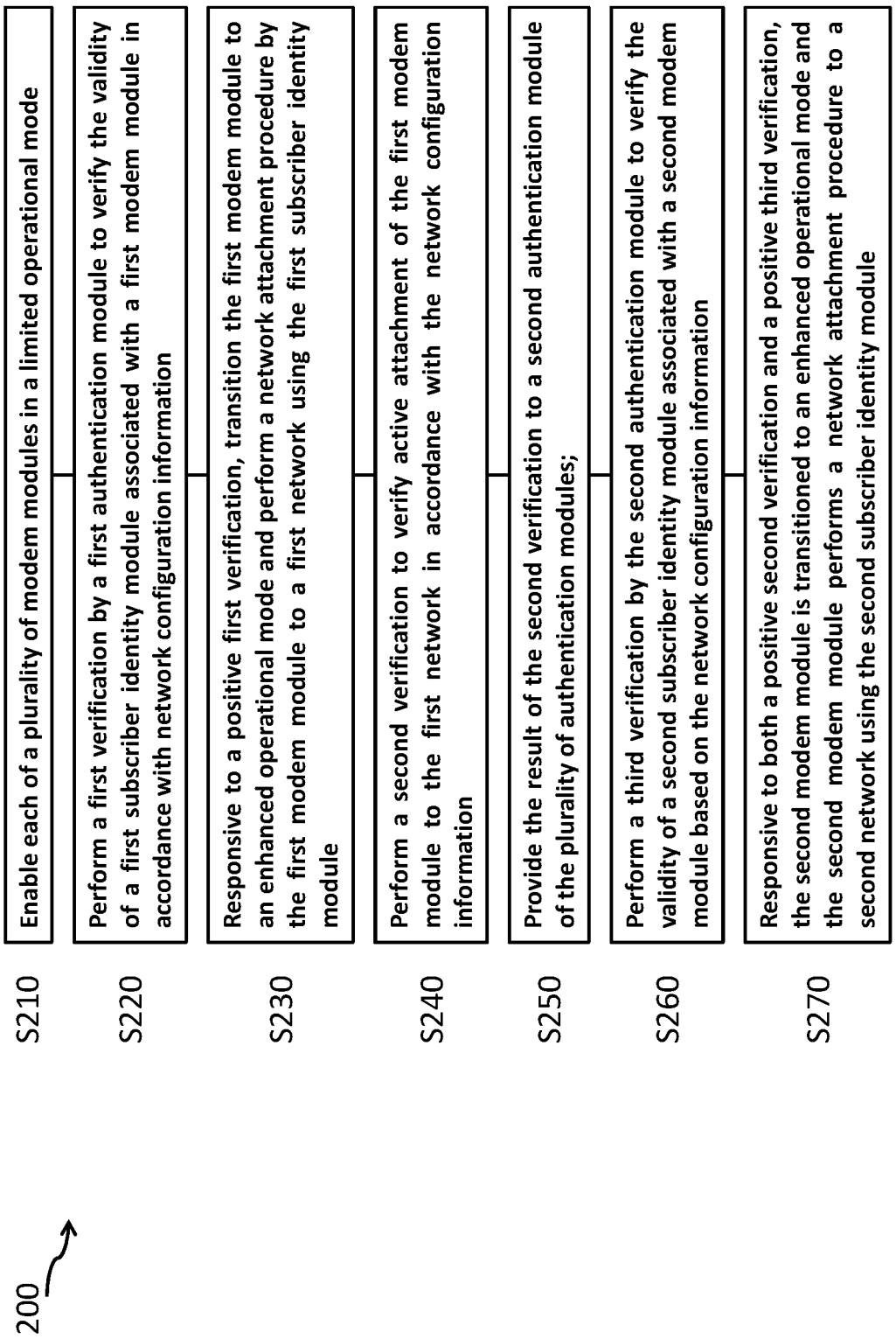
FIG. 2: Schematically illustrates a method for performing secure change of operational mode of a multi-SIM telecommunications device according to teachings of the disclosure.

FIG. 2 schematically illustrates a method 200 for performing secure change of operational mode of a multi-SIM telecommunications device according to teachings of the disclosure. It will be understood that method 200 can be implemented on the telecommunications device 100 depicted in FIG. 1. The method includes the following steps.

At step S210, each of a plurality of modem modules of the telecommunications device are enabled in a limited operational mode. The method then continues to step S220.

At step S220, a first verification is performed, by a first authentication module of a plurality of authentication modules of the telecommunications device, to verify the validity of a first subscriber identity module associated with a first modem module of the plurality of modem modules in accordance with network configuration information. The method then continues to step S230.

At step S230, responsive to a positive first verification at step S220, the first modem module is transitioned to an enhanced operational mode and the first modem module performs a network attachment procedure to a first network using the first subscriber identity module. The method then continues to step S240.

At step S240, a second verification is performed to verify active attachment of the first modem module to the first network in accordance with the network configuration information. The method then continues to step S250.

At step S250, the result of the second verification is provided to a second authentication module of the plurality of authentication modules. The method then continues to step S260.

At step S260, a third verification is performed, by the second authentication module, to verify the validity of a second subscriber identity module associated with a second modem module of the plurality of modem modules based on the network configuration information. The method then continues to step S270.

At step S270, responsive to both a positive second verification at step S240 of the first modem module and a positive third verification at step S260, the second modem module is transitioned to an enhanced operational mode and the second modem module performs a network attachment procedure to a second network using the second subscriber identity module.

It will be appreciated that the method steps can be performed in a different order to the current illustrative example described above. For example, the third verification step S260 may be performed at any point prior to step S270 and in some examples may be performed prior to both the first and second verification steps S220 and S240. It will also be appreciated that step S210 may be performed at any point prior to steps S230 and S270, for example, after steps S220 and S260.

In other words, the present approach can be considered, for example, as ensuring that all of a plurality of modem modules are placed into a limited operational mode and prevented from attaching, with their subscriber identity modules, to their corresponding networks until conditions set out in a network configuration information have been met. Thereby, security and control can be maintained by the network operator over the telecommunication device, for example a subsidised device under contract. In some examples, the networks may be a public land mobile network (PLMN).

As part of the conditions, permission for a second subscriber identity module to attach to a second network is dependent on both the second subscriber identity module individually meeting the conditions set out in a network configuration information but also dependent on there already being another active connection to a first network. The network operator which controls (and, in some examples, subsidises) the telecommunications device may also operate the first network. Thereby, by checking for an active network connection to the first network the present approach provides an implementation which avoids an issue with more simplistic approaches whereby the telecommunications device is permitted to transition to an enhanced operational mode simply on the basis of, a potentially inactive, subscriber identity module of the first network. Thereby the present implementation allows for the telecommunications device to connect to networks other than the first network operated by the network operator, while allowing the network operator to ensure that their network is actively being utilized. It will be appreciated that, in some examples, the first and/or second network may not be operated by the network operator which controls the telecommunications device. From one perspective, an active network connection can be thought of, for example, as the telecommunications device having been registered onto the network and monitoring at least one channel of the network.

In some examples, the second verification at step S240 is performed by a global authentication module and the global authentication module provides the result of the second verification to the second authentication module. Thereby the global authentication module can act as a central co-ordinating element. This can avoid duplication, for example, in telecommunication devices with more than two sets of authentication module—modem module—subscriber identity module, as the second verification can be performed, and the result distributed, once. The central co-ordination of the second verification at a global authentication module can allow for secure second verification by, for example, allowing for complex and involved security computation to be performed at a computationally powerful element.

In some examples, in response to the first subscriber identity module being detached from the first modem module or in response to the first modem module being disconnected from the first network, the connection of the second modem module to the second network is terminated. This implementation thereby ensures that the second network is only allowed to remain active while the first network remains active. This implementation thereby allows, for example, an operator of the first network who has subsidised the telecommunications device to allow a second network to be connected to, while ensuring that at all times there must be an active connection to the first network. In other examples, the second network is allowed to remain active for a period of time, e.g. 7 days, after the first network goes inactive. Thereby, the approach allows for a connection to a second network to be maintained even where, for example, there is temporarily no network coverage for the first network such as a remote rural area.

In some examples, the second verification is performed by a global authentication module and the global authentication module provides the result of the second verification to the second authentication module, and in response to determining that the first subscriber identity module has been detached from the first modem module or in response to determining that the first modem module has been disconnected from the first network, the global authentication module instructs the second authentication module to terminate the connection of the second modem module to the second network. Similarly, to the examples in the above two paragraphs, this approach provides an implementation whereby an operator of the first network who has subsidised the telecommunications device is able to allow a second network to be connected to while ensuring that at all times there must be an active connection to the first network and is able to do so in a centralized and secure manner.

In some examples, when a modem module of the plurality of modem modules is in a limited operational mode the modem module is restricted to only making emergency calls and in enhanced operational mode this restriction is lifted. The modem module may be permitted to make emergency calls in the limited operational modes to provide an implementation which complies with legal regulations in certain territories that require the ability to make emergency calls to always be maintained.

In some examples, more than one modem module and corresponding subscriber identity module may be tied to the first and second verification steps being positively passed. For example, the result of the second verification may be provided to a third authentication module of the plurality of authentication modules; a fourth verification may be performed, by the third authentication module, to verify the validity of a third subscriber identity module associated with a third modem module of the plurality of modem modules based on the network configuration information. Responsive to both a positive second verification of the first modem module and a positive fourth verification, the third modem module is transitioned to an enhanced operational mode and the third modem module performs a network attachment procedure to a third network using the third subscriber identity module.

Figure 3:
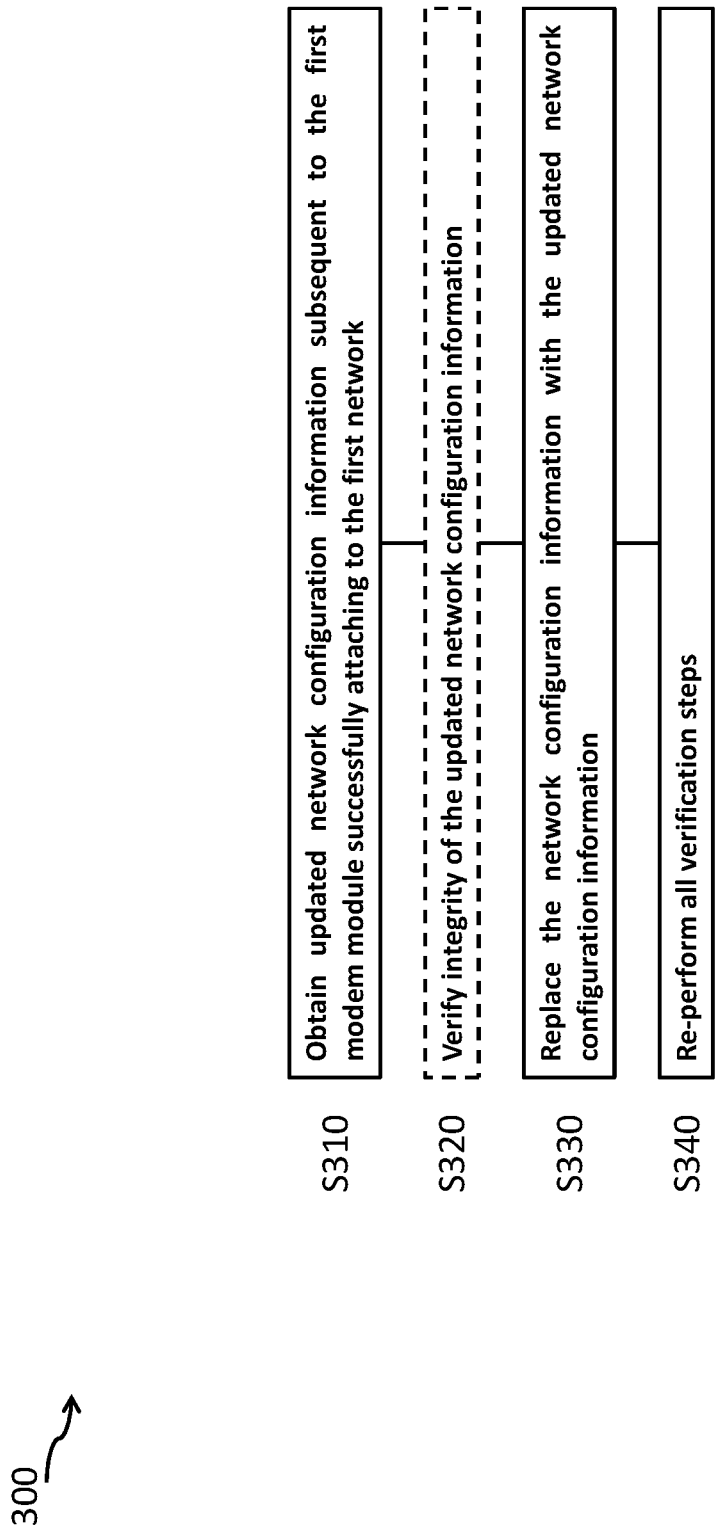
FIG. 3: Schematically illustrates a method for updating network configuration information according to teachings of the disclosure.

FIG. 3 schematically illustrates a method 300 for updating network configuration information according to teachings of the disclosure. It will be understood that method 300 can be implemented on the telecommunications device 100 depicted in FIG. 1. The method includes the following steps.

At step S310, subsequent to the first modem module successfully attaching to the first network, updated network configuration information is obtained. The method then continues to step S320.

At step S320, the integrity of the updated network configuration information is verified and responsive to a positive verification of the integrity the method then continues to step S330.

At step S330, the network configuration information is replaced with the updated network configuration information. The method then continues to step S340.

At step S340, all of the verification steps (for example steps S220, S230, S270) are re-performed using the updated network configuration information.

In the current example, at S310 updated network configuration information is obtained after the first network has been successfully attached, for example, by downloading updated network configuration information from a remote configuration server using the first network connection. In other examples, updated configuration information could be obtained in other manners, for example, via a WiFi® connection, via USB, via SD card, via Zigbee, via IrDA, as part of a firmware over the air (FOTA) update or via direct user input. By allowing for update of the network configuration information a network operator which controls the telecommunications device can update the behaviour of the telecommunications device, for example, in response to a subsidised period having expired or to implement further security features. In addition, by allowing for updating the network configuration information it is possible to manufacture the telecommunications device as a single SKU with the network configuration information subsequently being used to customize the device for a particular network operator.

In the current example, the received updated network configuration information is signed and is verified in step S320. This provides security by verifying that the updated network configuration information comes from an approved party, for example, a remote configuration server operated by the network operator of the first network. This, can for example, act to resist malicious parties spoofing the network configuration information to bypass the network operator's control of the telecommunications device. In other examples, however, the network configuration information may be updated without requiring that it is signed. By not signing the network configuration information computational and energy resources may be saved at the telecommunications device. In other examples, the integrity of the updated network configuration information could be protected in some other manner, for example, the settings embodied by the updated network configuration information could be encrypted.

In the current example, by explicitly re-performing all the verification steps at step S340 it is ensured that the network configuration information, and any changes embodied within it, is substantially immediately put into effect. In other examples, step S340 may be skipped and the updated network configuration information is utilized only as and when further verification steps would otherwise be performed. This can save computational and energy resources at the telecommunications device associated with re-performing the verification steps.

In some examples, the network configuration information specifies one or more verification conditions which must be met as part of the first, second and/or third verification steps, the verification conditions comprising one or more of: restriction or exclusion of the first/second subscriber identity module by public land mobile network (PLMN), restriction or exclusion of the first/second subscriber identity module by integrated circuit card identifier (ICCID), restriction or exclusion of the first/second subscriber identity module by international mobile subscriber identity (IMSI), restriction or exclusion of the first/second subscriber identity module by 5G subscription permanent identifier (5G-SUPI), restriction or exclusion of the first/second subscriber identity module by mobile country code (MCC), restriction or exclusion of the first/second subscriber identity module by mobile network code (MNC), restriction or exclusion of the first/second subscriber identity module by mobile subscriber identification number (MSIN). As such, the network configuration information can set a wide range of conditions which must be met in order for the verification steps to be met. By way of example, the network configuration information could specify a specific subscriber identity module (e.g. by restricting by IMSI) which must be used to perform the first and second verification before any other subscriber identity module is permitted to connect to a network. It will be understood that in examples with more than two subscriber identity the network configuration information can specify verification conditions for any or all of the subscriber identity modules.

In some examples, the network configuration information specifies one or more policies which must be applied, the one or more policies comprising one or more of: restriction on the first/second subscriber identity module being used to make voice calls, restriction on the first/second subscriber identity module being used to transceiving data, restricting the network access mechanism which may be used by the first/second subscriber identity module to attach to a network, restriction on which SIM features may be used by the first/second subscriber identity module, restriction on roaming by the first/second subscriber identity module. In other words, for example, the network configuration information sets conditions on how a network connected to by a modem module using a subscriber identity module may be used. Further, the network configuration information can set a wide range of policies which dictate how a subscriber identity module, and a corresponding network which it facilitates a modem module in connecting to, may operate. In particular, these policies allow for finer grained control beyond simply, on the one hand allowing a subscriber identity module to have full access, and on the hand limiting a subscriber identity module to emergency calls only or no network functionality whatsoever. It will be understood that in examples with more than two subscriber identity the network configuration information can specify policies for any or all of the subscriber identity modules.

Figure 4:
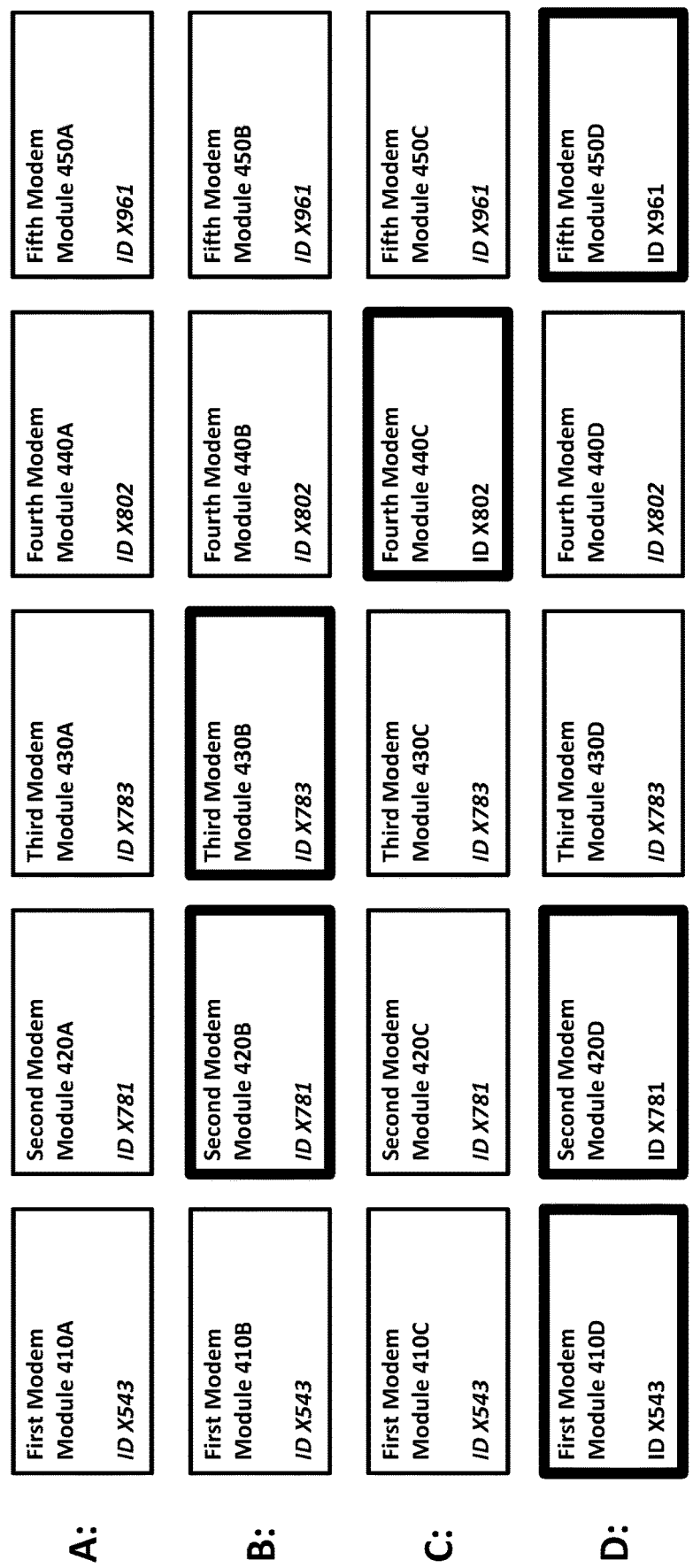
FIG. 4: Schematically illustrates specification of specific modem modules using modem module identifiers indicated by network configuration information according to teachings of the disclosure.

FIG. 4 schematically illustrates specification of specific modem modules using modem module identifiers indicated by network configuration information according to teachings of the disclosure. In some examples, the depicted modem modules 410, 420, 430, 440, 450 are substantially similar to the modem modules 140 depicted in FIG. 1. FIG. 4 depicts four lines, A, B, C and D which describe four illustrative examples of different indications of modem modules which can be provided for by network configuration information.

As can be seen, each of modem modules 410, 420, 430, 440, 450 has an associate modem module identifier. In the depicted example, modem module 410 has an identifier of X543, modem module 420 has an identifier of X781, modem module 430 has an identifier of X783, modem module 440 has an identifier of X802, modem module 450 has an identifier of X961. It will be appreciated that the depicted identifiers are merely illustrative examples and in implementations may take different forms. In some examples, the modem module identifier comprises an international mobile equipment identity (IMEI) or a permanent equipment identifier (PEI). In some examples, certain modem module identifiers correspond to particular subscriber identification module technologies, for example, eSIM.

In illustrative example A, no particular modem module identifier have been specified by the network configuration information. This may result in uniform verification conditions and policies being applied equally.

In illustrative example B, a range of modem module identifiers have been indicated in the network configuration information, for example X700 to X800. This has resulted in two of the five modem modules, second modem module 420B and third modem module 430B, being specified in the network configuration information for application of different verification conditions and/or polices to the remaining modem modules.

In illustrative example C, a specific modem module identifier has been included in the network configuration information, X802. This has resulted in the fourth modem module 440C being specified in the network configuration information for application of different verification conditions and/or polices to the remaining modem modules.

In illustrative example D, the network configuration information has indicated a range of modem module identifier, X500 to X 782, for which a first set of verification conditions and polices are to be applied, and has indicated a specific modem module identifier, X961, for which a second set of verification conditions and polices are to be applied, with all other modem modules with modem module identifier not falling within either of these two conditions having a third set of verification conditions and polices applied.

Thereby, the network configuration information can be used to limit various verification conditions and polices, to specific modem modules which can avoid the need for over-broad application of such verification conditions and polices. For example, a network operator could specify that they are only applying verification conditions and policies to a specific one of the modem modules present on a device.

In some examples, the network configuration information requires a specific one of the plurality of modem modules to act as the first modem module for which the first verification and second verification is performed. Thereby, from one perspective, operation of the device can be made more uniform and straightforward by consistently requiring a particular modem module (which may be associated with a specific subscriber identification module technology e.g. eSIM) to operate with the subscriber identity module which connects to the "required" first network of the network operator that controls the device. This can make support and maintenance more straightforward.

In other examples, the network configuration information permits any of the plurality of modem modules to act as the first modem module for which the first verification and second verification is performed. This give a user flexibility to perform the "required" active connection to the first network of the network operator that controls the device using any available modem module and corresponding supported subscriber identification module technology.

Figure 5:
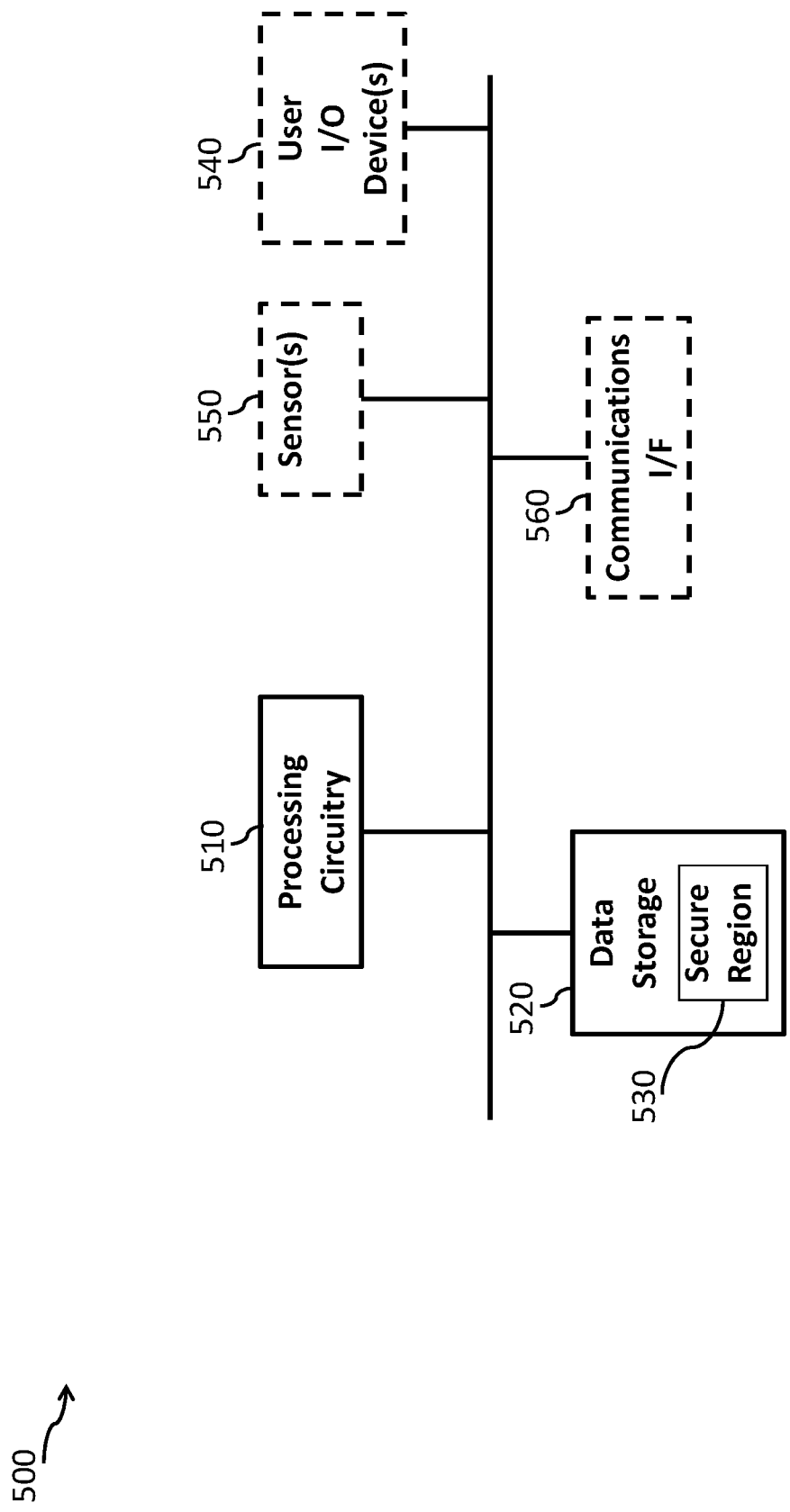
FIG. 5: Schematically illustrates an example of an electronic device which can be used to implement teachings of the disclosure While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

FIG. 5 schematically illustrates an example of an electronic device 500 which can be used to implement the telecommunications device 100 as depicted in FIG. 1 as well as any of the teachings discussed in FIGS. 2 to 4. The device has processing circuitry 510 for performing data processing in response to program instructions, data storage 520 for storing data and instructions to be processed by the processing circuitry 510. In some examples, the processing circuitry 510 can correspond to processing circuitry which is operable to implement a Trusted Execution Environment (TEE) and a Rich Execution Environment (REE). The Trusted Execution Environment (TEE) acts as a secure area of a processor in which to execute sensitive applications and processes. The TEE is isolated from a Rich Execution Environment (REE) in which a rich-OS can be executed. In some examples, the processing circuitry 510 includes one or more caches for caching recent data or instructions. The data storage 520 may have a secure region 530 which is protected by hardware mechanisms (e.g. using memory protection units or security mechanisms providing a TEE) or by software mechanisms (e.g. encryption), so that data stored in a secure region 530 is inaccessible to software not executing within a trusted environment. The device 500 may have a communications interface 560 for communicating with external devices. For example communications interface 560 could use any other range of different communication protocols, such as cellular, Ethernet, WiFi®, Bluetooth®, ZigBee®, etc. The device may have one or more sensors 550 for sensing certain external conditions such as temperature, pressure, the proximity of a nearby user, etc. The specific sensors 550 provided may depend on the purpose of the device. For example sensors 550 may include sensors which aid in biometric authentication such as a fingerprint sensor and a face recognition camera system. It will be appreciated that FIG. 5 is merely an example of possible hardware that may be provided in the device and other components may also be provided. For example, some devices for which user interaction is expected may be provided with one or more user input/output device(s) 540 to receive input from a user or to output information to a user.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

Further examples of feature combinations taught by the present disclosure are set out in the following numbered clauses:

1. A method for performing secure change of operational mode of a multi-SIM telecommunications device, the method comprising:
   enabling each of a plurality of modem modules of the telecommunications device in a limited operational mode;
   performing a first verification, by a first authentication module of a plurality of authentication modules of the telecommunications device, to verify the validity of a first subscriber identity module associated with a first modem module of the plurality of modem modules in accordance with network configuration information,
      wherein responsive to a positive first verification the first modem module is transitioned to an enhanced operational mode and the first modem module performs a network attachment procedure to a first network using the first subscriber identity module;
   performing a second verification to verify active attachment of the first modem module to the first network in accordance with the network configuration information;
   providing the result of the second verification to a second authentication module of the plurality of authentication modules;
   performing a third verification, by the second authentication module, to verify the validity of a second subscriber identity module associated with a second modem module of the plurality of modem modules based on the network configuration information,
      wherein responsive to both a positive second verification of the first modem module and a positive third verification, the second modem module is transitioned to an enhanced operational mode and the second modem module performs a network attachment procedure to a second network using the second subscriber identity module.

2. The method of clause 1, wherein the second verification is performed by a global authentication module and the global authentication module provides the result of the second verification to the second authentication module.

3. The method of clause 1 or clause 2, wherein in response to the first subscriber identity module being detached from the first modem module or in response to the first modem module being disconnected from the first network, the connection of the second modem module to the second network is terminated.

4. The method of clause 3, wherein the second verification is performed by a global authentication module and the global authentication module provides the result of the second verification to the second authentication module, and
   wherein in response to determining that the first subscriber identity module has been detached from the first modem module or in response to determining that the first modem module has been disconnected from the first network, the global authentication module instructs the second authentication module to terminate the connection of the second modem module to the second network.

5. The method of any preceding clause, wherein subsequent to the first modem module successfully attaching to the first network, updated network configuration information is obtained and replaces the network configuration information and wherein all verification steps are re-performed using the updated network configuration information.

6. The method of clause 5, wherein when the updated network configuration information is obtained the updated network configuration information is signed, and prior to replacement of the network configuration information with the updated network configuration information the signature of the updated network configuration information is verified.

7. The method of any preceding clause, wherein the network configuration information specifies one or more verification conditions which must be met as part of the first, second and/or third verification steps, the verification conditions comprising one or more of: restriction or exclusion of the first/second subscriber identity module by PLMN, restriction or exclusion of the first/second subscriber identity module by ICCID, restriction or exclusion of the first/second subscriber identity module by IMSI, restriction or exclusion of the first/second subscriber identity module by 5G subscription permanent identifier (5G-SUPI) restriction or exclusion of the first/second subscriber identity module by MCC, restriction or exclusion of the first/second subscriber identity module by MNC, restriction or exclusion of the first/second subscriber identity module by MSIN.

8. The method of any preceding clause, wherein the network configuration information specifies one or more policies which must be applied, the one or more policies comprising one or more of: restriction on the first/second subscriber identity module being used to make voice calls, restriction on the first/second subscriber identity module being used to transceiving data, restricting the network access mechanism which may be used by the first/second subscriber identity module to attach to a network, restriction on which SIM features may be used by the first/second subscriber identity module, restriction on roaming by the first/second subscriber identity module.

9. The method of any preceding clause, wherein each of the modem modules of the plurality of modem modules has an associated modem module identifier and wherein the network configuration information specifies specific modem module identifiers and/or ranges of modem module identifiers to which particular verification conditions are to be applied to subscriber identity modules by the specified modem modules.

10. The method of any preceding clause, wherein each of the modem modules of the plurality of modem modules has an associated modem module identifier and wherein the network configuration information specifies specific modem module identifiers and/or ranges of modem module identifiers to which particular policies are to be applied to subscriber identity modules by the specified modem modules.

11. The method of any preceding clause, wherein when a modem module of the plurality of modem modules is in a limited operational mode the modem module is restricted to only making emergency calls and in enhanced operational mode this restriction is lifted.

12. The method of any preceding clause, wherein each of the first subscriber identity module and the second subscriber identity module is one of a SIM, an eSIM, a USIM, an iSIM, an eUICC, an iUICC, a TEE-SIM and a SoftSIM.

13. The method of any preceding clause, wherein the network configuration information requires a specific one of the plurality of modem modules to act as the first modem module for which the first verification and second verification is performed.

14. The method of any preceding clause, wherein the network configuration information permits any of the plurality of modem modules to act as the first modem module for which the first verification and second verification is performed.

15. The method of any preceding clause, further comprising:
providing the result of the second verification to a third authentication module of the plurality of authentication modules;
performing a fourth verification, by the third authentication module, to verify the validity of a third subscriber identity module associated with a third modem module of the plurality of modem modules based on the network configuration information,
wherein responsive to both a positive second verification of the first modem module and a positive fourth verification, the third modem module is transitioned to an enhanced operational mode and the third modem module performs a network attachment procedure to a third network using the third subscriber identity module.

16. A computer program to perform the method of any preceding clause.

17. At least one computer-readable medium storing the computer program of clause 16.

18. A device comprising:
processing circuitry to perform data processing; and
data storage storing at least one computer program for controlling the processing circuitry to perform the method of any of clauses 1 to 15.

The invention claimed is:

1. A method for performing secure change of operational mode of a multi-SIM telecommunications device, the method comprising:
enabling each of a plurality of modem modules of the telecommunications device in a limited operational mode;
performing a first verification, by a first authentication module of a plurality of authentication modules of the telecommunications device, to verify the validity of a first subscriber identity module associated with a first modem module of the plurality of modem modules in accordance with network configuration information,
wherein responsive to a positive first verification the first modem module is transitioned to an enhanced operational mode and the first modem module performs a network attachment procedure to a first network using the first subscriber identity module;
performing a second verification to verify active attachment of the first modem module to the first network in accordance with the network configuration information;
providing the result of the second verification to a second authentication module of the plurality of authentication modules;
performing a third verification, by the second authentication module, to verify the validity of a second subscriber identity module associated with a second modem module of the plurality of modem modules based on the network configuration information,
wherein responsive to both a positive second verification of the first modem module and a positive third verification, the second modem module is transitioned to an enhanced operational mode and the second modem module performs a network attachment procedure to a second network using the second subscriber identity module.

2. The method of claim 1, wherein the second verification is performed by a global authentication module and the global authentication module provides the result of the second verification to the second authentication module.

3. The method of claim 1, wherein in response to the first subscriber identity module being detached from the first modem module or in response to the first modem module being disconnected from the first network, the connection of the second modem module to the second network is terminated.

4. The method of claim 3, wherein the second verification is performed by a global authentication module and the global authentication module provides the result of the second verification to the second authentication module, and
wherein in response to determining that the first subscriber identity module has been detached from the first modem module or in response to determining that the first modem module has been disconnected from the first network, the global authentication module instructs the second authentication module to terminate the connection of the second modem module to the second network.

5. The method of claim 1, wherein subsequent to the first modem module successfully attaching to the first network, updated network configuration information is obtained and replaces the network configuration information and wherein all verification steps are re-performed using the updated network configuration information.

6. The method of claim 5, wherein when the updated network configuration information is obtained the updated network configuration information is signed, and prior to replacement of the network configuration information with the updated network configuration information the signature of the updated network configuration information is verified.

7. The method of claim 1, wherein the network configuration information specifies one or more verification conditions which must be met as part of the first, second and/or third verification steps, the verification conditions comprising one or more of: restriction or exclusion of the first/second subscriber identity module by PLMN, restriction or exclusion of the first/second subscriber identity module by ICCID, restriction or exclusion of the first/second subscriber identity module by IMSI, restriction or exclusion of the first/second subscriber identity module by 5G subscription permanent identifier (5G-SUPI) restriction or exclusion of the first/second subscriber identity module by MCC, restriction or exclusion of the first/second subscriber identity module by MNC, restriction or exclusion of the first/second subscriber identity module by MSIN.

8. The method of claim 1, wherein the network configuration information specifies one or more policies which must be applied, the one or more policies comprising one or more of: restriction on the first/second subscriber identity module being used to make voice calls, restriction on the first/second subscriber identity module being used to transceiving data, restricting the network access mechanism which may be used by the first/second subscriber identity module to attach to a network, restriction on which SIM features may be used by the first/second subscriber identity module, restriction on roaming by the first/second subscriber identity module.

9. The method of claim 1, wherein each of the modem modules of the plurality of modem modules has an associated modem module identifier and wherein the network configuration information specifies specific modem module identifiers and/or ranges of modem module identifiers to which particular verification conditions are to be applied to subscriber identity modules by the specified modem modules.

10. The method of claim 1, wherein each of the modem modules of the plurality of modem modules has an associated modem module identifier and wherein the network configuration information specifies specific modem module identifiers and/or ranges of modem module identifiers to which particular policies are to be applied to subscriber identity modules by the specified modem modules.

11. The method of claim 1, wherein when a modem module of the plurality of modem modules is in a limited operational mode the modem module is restricted to only making emergency calls and in enhanced operational mode this restriction is lifted.

12. The method of claim 1, wherein each of the first subscriber identity module and the second subscriber identity module is one of a SIM, an eSIM, a USIM, an iSIM, an eUICC, an iUICC, a TEE-SIM and a SoftSIM.

13. The method of claim 1, wherein the network configuration information requires a specific one of the plurality of modem modules to act as the first modem module for which the first verification and second verification is performed.

14. The method of claim 1, wherein the network configuration information permits any of the plurality of modem modules to act as the first modem module for which the first verification and second verification is performed.

15. The method of claim 1, further comprising:
providing the result of the second verification to a third authentication module of the plurality of authentication modules;
performing a fourth verification, by the third authentication module, to verify the validity of a third subscriber identity module associated with a third modem module of the plurality of modem modules based on the network configuration information,
wherein responsive to both a positive second verification of the first modem module and a positive fourth verification, the third modem module is transitioned to an enhanced operational mode and the third modem module performs a network attachment procedure to a third network using the third subscriber identity module.

16. A storage medium storing a computer program for controlling an electronic device to perform the method of claim 1.

17. An electronic device comprising:
processing circuitry to perform data processing; and
data storage storing at least one computer program for controlling the processing circuitry to perform the method of claim 1.

* * * * *